United States Patent [19]
Evans, Jr. et al.

[11] 3,894,289
[45] July 8, 1975

[54] HIGH POWER LASER APPARATUS AND SYSTEM

[75] Inventors: John C. Evans, Jr.; Henry W. Brandhorst, Jr., both of Berea, Ohio

[73] Assignee: The United States of America as represented by the United States National Aeronautics and Space Administration, Office of General Counsel-Code GP, Washington, D.C.

[22] Filed: July 29, 1968

[21] Appl. No.: 848,403

Related U.S. Application Data

[62] Division of Ser. No. 487,929, Sept. 16, 1965, abandoned.

[52] U.S. Cl. ............ 330/4.3; 331/94.5 A; 240/41 B
[51] Int. Cl. ............................................... H01s 3/09
[58] Field of Search ................... 331/94.5; 250/238; 240/41.35 R; 60/26; 126/270; 244/1 SS; 330/4.3

[56] References Cited
UNITED STATES PATENTS

| | | | |
|---|---|---|---|
| 1,928,002 | 9/1933 | Berg | 240/41.35 |
| 2,402,662 | 6/1946 | Ohl | 250/238 X |
| 3,174,705 | 3/1965 | Schiff et al. | 244/1 |
| 3,434,678 | 3/1969 | Brown et al. | 244/1 |
| 3,569,861 | 3/1971 | Tucker | 331/94.5 |

FOREIGN PATENTS OR APPLICATIONS

| | | | |
|---|---|---|---|
| 966,455 | 8/1964 | United Kingdom | 331/94.5 |

OTHER PUBLICATIONS

Hogg et al., Masers & Lasers, TK 7872 M 45, 1962, pp. 171–173.

*Primary Examiner*—Maynard R. Wilbur
*Assistant Examiner*—N. Moskowitz
*Attorney, Agent, or Firm*—N. T. Musial; Gene E. Shook; John R. Manning

[57] ABSTRACT

Increasing the power output of a laser beam by increasing the flashing rate of a source of coherent light. Power is transmitted by using a laser as a transmitter of coherent light.

1 Claim, 3 Drawing Figures

FIG. 2

INVENTORS
JOHN C. EVANS JR.
HENRY W. BRANDHORST JR.

BY

Irving M. Kriegsman
ATTORNEYS

HIGH POWER LASER APPARATUS AND SYSTEM

The invention described herein may be manufactured and used by or for the Government of the United States of America for governmental purposes without the payment of any royalties thereon or therefor.

STATEMENT OF COPENDENCY

This is a division of application Ser. No. 487,929, filed Sept. 16, 1965 now abandoned.

The instant invention relates to lasers. More particularly, the instant invention relates to apparatus for use in producing a source of incoherent light capable of initiating laser action in a laser material and a system utilizing the coherent light emitting from the laser material.

The word laser is an acronym for the phrase "light amplification by stimulated emission of radiation."

The instant invention is intended for particular use with lasers utilizing a solid laser material such as ruby to produce a narrow beam of coherent light.

The operation of the laser is based on the fact that the atomic systems represented by the molecules of the laser material can exist in any series of discreet energy levels or states. These systems absorb energy when going to a higher state and emit energy when going to a lower state. The atomic systems are raised from the lower or ground level to the higher of the three levels by irradiation from a strong light source which need not be coherent but should preferably have a high concentration of energy in the shorter wave length. The operation of raising the energy level of the laser to produce the desired photon emission is referred to in the art as optical pumping.

Optical pumping may be achieved by, for example, discharging a conventional capacitor into a xenon-filled flash lamp. The light output of the lamp is then sufficient to promote laser action. At the present time the light output of flash lamps is rated generally between 100-100,000 joules depending upon construction and design details. Conversion of this light into laser output is around 4 percent efficient and hence, laser beams up to 4000 joules can be obtained. Simultaneous flashing of several lamps is also in use.

Certain desired uses for lasers such as point to point power transmission, welding, rock drilling, and materials cutting would appear to require high energy density in the laser beam.

It has been proposed to increase the power output of a laser beam by increasing the power density of a single pulse laser. However, it would appear to be difficult to handle the giant pulse thus produced, and hence, such an arrangement would have very limited application.

It is therefore an object of the instant invention to produce a laser output having a high average power density.

It is another object of the instant invention to produce a laser having an essentially continuous wave output.

It is another object of the instant invention to provide for a laser output that is easily controllable. It is yet still another object of the instant invention to provide for a laser apparatus wherein the energy storage requirements are modest.

It is another object of the instant invention to provide for a laser apparatus wherein the capacitors that form part of the power supply for the light source are capable of operation at higher frequencies.

It is yet still another object of the instant invention to provide for a laser apparatus wherein the size of the capacitor banks or the power supply are relatively small.

It is another object of the instant invention to provide for a new power transmission system utilizing a laser apparatus and an energy collecting system.

It is still another object of the instant invention to provide for a new and improved arrangement for producing incoherent light for use in pumping a laser material.

It is another object of the instant invention to provide a source of high intensity light having a high pulsing rate.

The aforesaid objects of the instant invention and other objects which will become apparent as the description proceeds are achieved by increasing the flashing rate of the source of incoherent light, or in other words, firing the laser more times per unit time interval. Increasing the flashing rate or firing rate of the source of incoherent light results in a series of low amplitude output pulses. The time integration of the energy content of these pulses yields a higher average power than a single giant pulse which in turn results in an increased laser output. This method of firing the laser more times per unit, that is, repetitive pulsing, is achieved in the following manner. In one embodiment a plurality of six xenon flash tubes which are circumferentially disposed around a laser rod are fired repetitively in succession by the use of a high speed motor connected to an automobile-type distributor which triggers a suitable firing circuit. The flash tubes are powered through a bank of fast charging capacitors. The apparatus is arranged so that while one of the capacitors is discharging into one of the flash tubes and causing it to fire the other five are being charged. Another embodiment involves an exploding wire mounted on a reel which is moved by a high speed driving motor.

The wire is mounted so as to pass through one of two electrodes and is movable toward the other electrode. When the wire comes into contact with the other electrode a circuit is closed, producing thereby a high intensity flash of light.

Repetitive pulsing or increasing the output pulses per unit time results in a high power density beam for an extended period of time. For example, a repetition rate of 20 pulses per second for a 50 joule pulse will issue a kilowatt of laser power; however, a flashing rate of 1000 per second will result in a power output of 50 kilowatts.

Other objects and many of the attendant advantages of this invention will be readily appreciated as the same becomes better understood by reference to the following description when considered in connection with the accompanying drawings and wherein like reference numerals designate like parts throughout the figures thereof and wherein FIG. 1 is a combination pictorial and schematic view of one embodiment of a laser-type energy transmitter;

Figure 1:
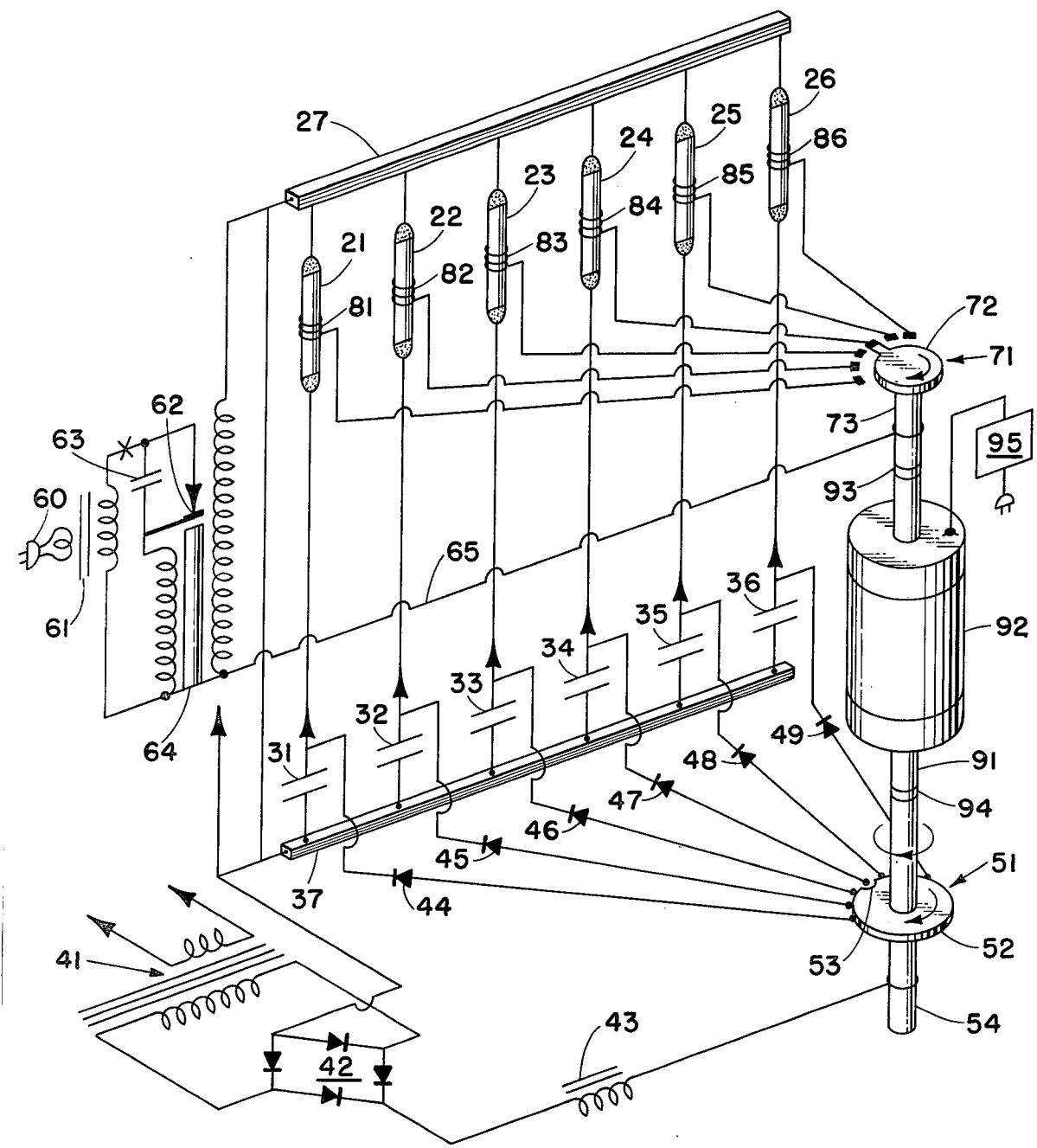
Figure 2:
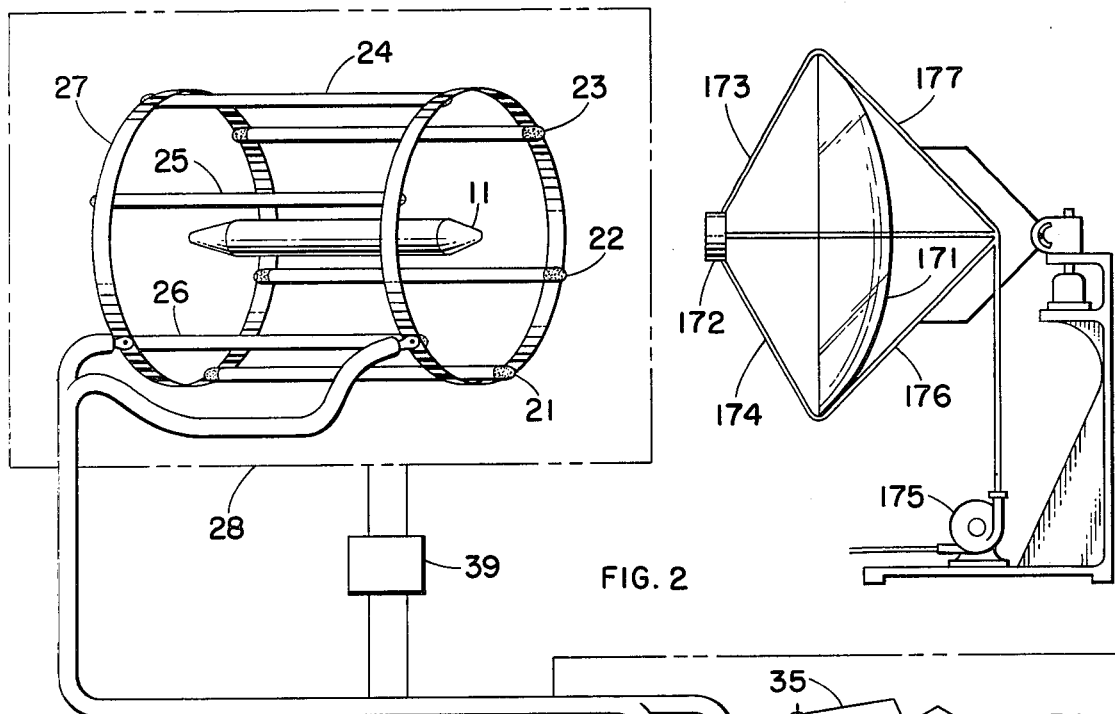
FIG. 2 is a pictorial representation of a power transmission system using the energy transmitter of FIG. 1.

Referring now to FIGS. 1 and 2 there is shown in FIG. 2 a cylindrically formed crystal or rod 11 of laser material such as ruby. The crystal or rod 11 of laser material is activated by means of a rapid pulsing light source. In the embodiment shown, the light source includes a plurality of six xenon discharge lamps 21 through 26, circumferentially surrounding the laser rod 11 and mounted on a common lamp bank 27. In the embodiment shown, the six xenon discharge lamps 21 through 26 are each rated at 3000 watt seconds. The xenon discharge lamps 21 through 26 are arranged by a mechanical switching means so as to repetitively fire in succession.

The xenon discharge lamps 21 through 26 are energized by means of a capacitive-type discharge circuit and are triggered by means of an induction coil circuit. The capacitor-type energizing circuit and the induction coil triggering circuit are mechanically coupled to the xenon discharge lamps 21 through 26 so as to provide for repetitive firing in succession.

The capacitor energizing circuit includes six capacitors 31 through 36 connected to a common bank 37. Each one of the capacitors 31 through 36 is electrically connected to one of the xenon discharge lamps 21 through 26; i.e. capacitor 31 is electrically connected to xenon discharge lamp 21, etc. The capacitors 31 through 36 are preferably 15 mfd at 20 kv with a self inductance of 0.06 microhenries. The energy content of each capacitor 31 through 36 is approximately 3000 joules.

The capacitor bank 37 is powered by means of a power supply circuit including a high voltage power transformer 41 connected to a full bridge rectifier 42 which in turn is connected to a charging reactor 43. The full bridge rectifier 42 converts the alternating current to direct current and the charging reactor 43 limits the charging current to a safe value. Power from the charging reactor 43 is transmitted to the capacitor bank 37 through a commutator-type switch 51. Diodes 44 through 49 prevent current from flowing back to the power supply. The switch includes a rotating member 52 having a cutaway portion 53 and adapted thereby to contact and transmit current to all but one of the capacitors. Rotating member 52 is mounted on an electrically conductive shaft 54.

The induction coil triggering circuit includes a step down transformer 61, an interrupter 62, a capacitor 63, an induction coil 64 and a plug 60 adapted to be connected to a source of voltage. Power from the induction coil triggering circuit is selectively transmitted through an electrical conductor 65 from a switch 71 to a plurality of six trigger coils 81 through 86 which are connected respectively to the six discharge lamps 21 through 26.

The switch 71 which may be in the form of an automobile distributortype switch which is electrically conductive and the power supply (or commutator) switch 51 are mechanically coupled by means of a drive shaft 91 which is turned by means of a variable speed motor 92 which may be regulated by a variable speed control means 95 such as silicon controlled rectifiers or thyratrons. Couplings 93 and 94 electrically separate the commutator switch 51 and the distributor switch 71. Switch 71 includes a disc 72 mounted on an electrically conductive shaft 73.

By means of this coupling arrangement at any one interval of time, one of the xenon discharge lamps 21 through 26 will be firing.

For example, with the switches in the position shown in the embodiment in FIG. 1 capacitors 31, 32, 33, 35, and 36 are being charged. At the same time the induction coil triggering circuit is connected through the automobile-type distributor switch 71 to trigger coil 84 which is connected to xenon discharge lamp 24. The gas in the lamp 24 is ionized providing an electrical path and causing the capacitor 34 connected across said lamp 24 to discharge and the lamp 24 to thereby flash brightly. During this flashing time all the other capacitors, i.e. 31, 32, 33, 35 and 36 are charging and as the distributor shaft 91 rotates, another trigger coil is energized and another lamp is fired.

In FIG. 2 is shown in simplified form an entire system for transmitting power utilizing the laser apparatus of FIG. 1. It should be noted however, that the laser apparatus of FIG. 3 could also be employed. Although not shown in FIG. 2 the distributors and attendant power supplies are physically located in the center of the capacitor bank. The capacitor is enclosed within a coolant tank 38. Circumferentially disposed around the laser rod 11 are the six flash tubes 21 through 26. The entire laser assembly is also enclosed within a cooling chamber 28. Recirculating pump 39 connects the coolant tank 38 to the laser chamber 28. The coherent light emitted from the laser transmitter is collected at a distant point by an energy collector in the form of a parabolic reflector 171 having at its focus a plurality of high current solar cells 172. These solar cells 172 are mounted at the focal plane of and supported from the reflector by means of tubes 173 and 174 which also serve as coolant channels. These channels 173 and 174 carry a coolant from a pump and tank 175. The coolant is transmitted to channel 173 through a mirror support 176 which is also a channel and is carried back from this channel 174 through mirror support 177.

Figure 3:
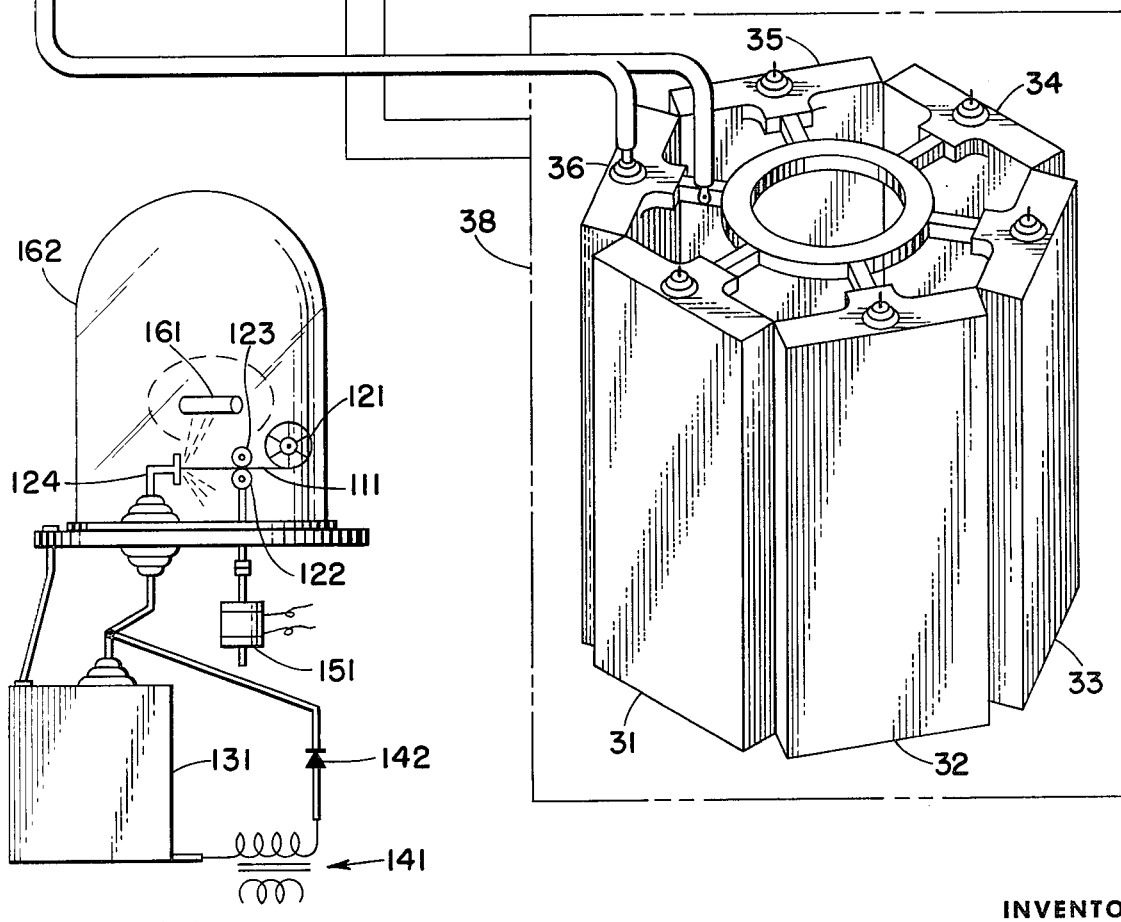
FIG. 3 is a view in elevation of another embodiment of a laser-type energy transmitter.

In FIG. 3 is shown another embodiment of the instant invention wherein repetitive flashing is obtained by means of an exploding wire. In this embodiment a length of wire 111 mounted on a wire reel 121 is fed through a pair of rollers 122, 123 and moved in a direction of a firing block 124 which is spaced apart from the rollers 122, 123. When the wire 111 comes into contact with the firing block 124 a circuit consisting of a bank of rapid cycling high voltage capacitors 131 connected to the firing block 124 and the rollers 122, 123 is completed and the bank of high voltage capacitors 131 are discharged causing the wire 111 to explode. While the free end of the wire 111 is moving toward the firing block 124, the bank of high voltage capacitors 131 is being charged through a high frequency power supply 141. The feed system includes a drive motor 151 mechanically connected to the rollers. A blocking diode 142 is connected between the high frequency power supply 141 and the bank of high voltage capacitors 131. The wire 111 and laser rod 161 are enclosed in a vacuum chamber 162.

Obviously, many modifications and variations of the present invention are possible in light of the above teachings. It is therefore to be understood that, within the scope of the appended claims, the invention may be practiced other than as specifically described.

We claim:
1. A high power transmission system comprising
   a laser for transmitting a beam of coherent light, said laser including
      a rod of a laser material,
      a plurality of gaseous discharge lamps for pumping said rod, a capacitor electrically connected to each of said discharge lamps,
triggering circuit means for providing a high voltage,
first switching means for selectively connecting the triggering means to one of said discharge lamps,
power supply means, and
second switching means for electrically connecting the power supply means to all but one of said capacitors, said first switching means being mechanically coupled to said second switching means whereby said capacitor not connected to said power supply means is electrically connected to said discharge lamp which is electrically connected to said triggering circuit means,
a parabolic reflector spaced apart from said laser for collecting the beam of coherent light emitted from the transmitter,
a photovoltaic device for converting said beam of collected coherent light into electrical energy, and
means for cooling the laser, parabolic reflector, and the photovoltaic device.

* * * * *